Oct. 7, 1941.  T. J. MATTHEWS  2,258,577
MACHINE FOR MAKING SMALL ARM AMMUNITION
Filed Aug. 29, 1939  5 Sheets-Sheet 3
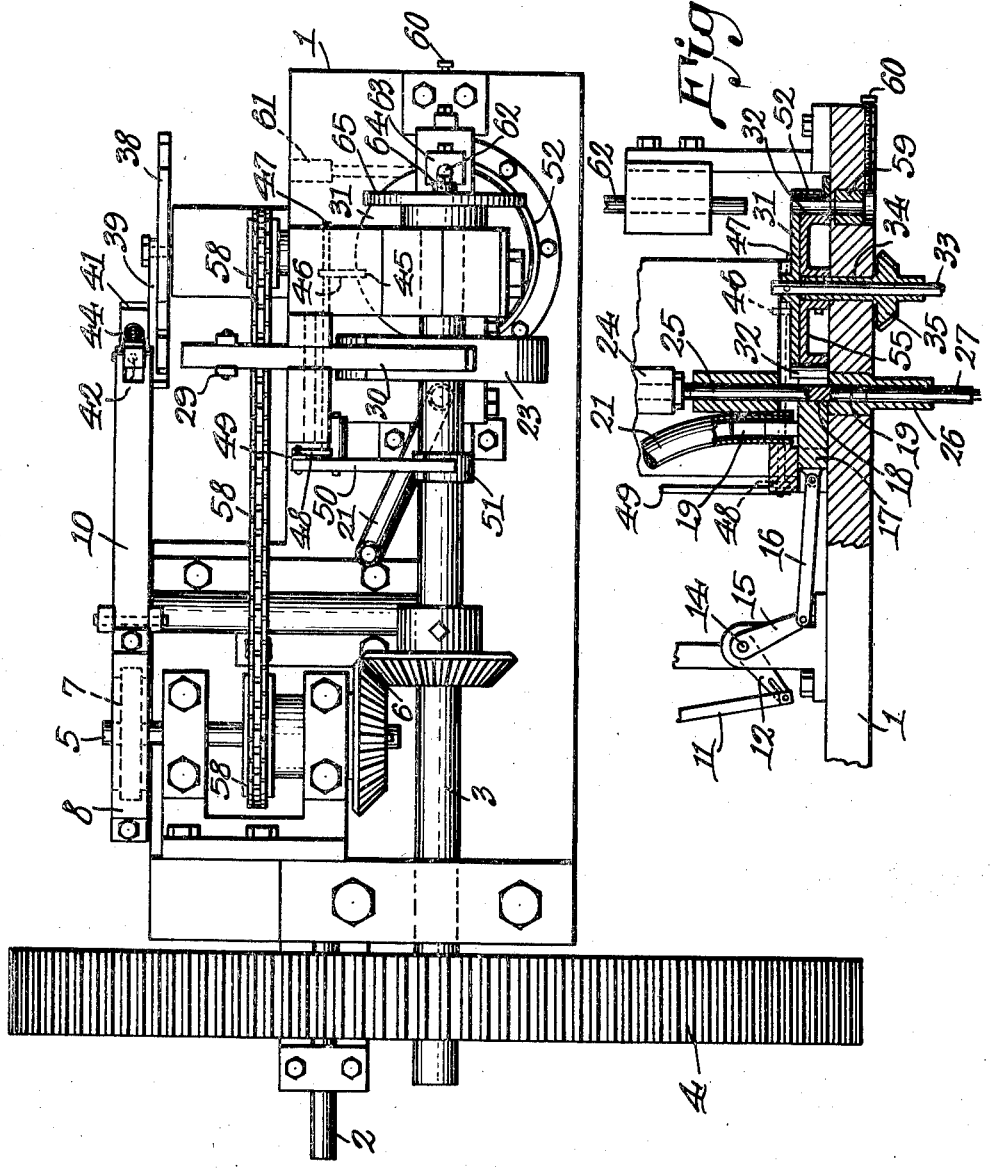
T. J. Matthews INVENTOR.

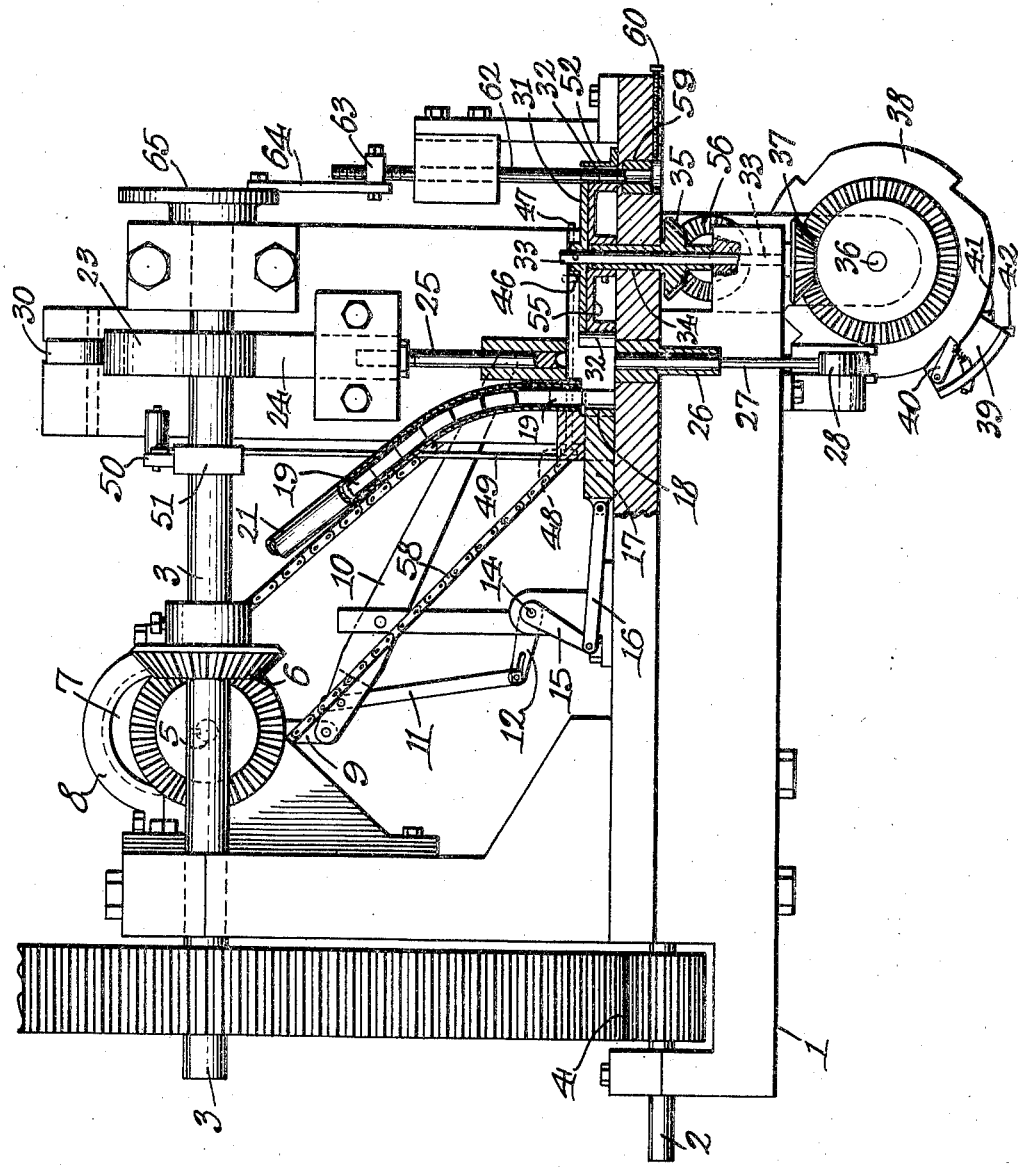

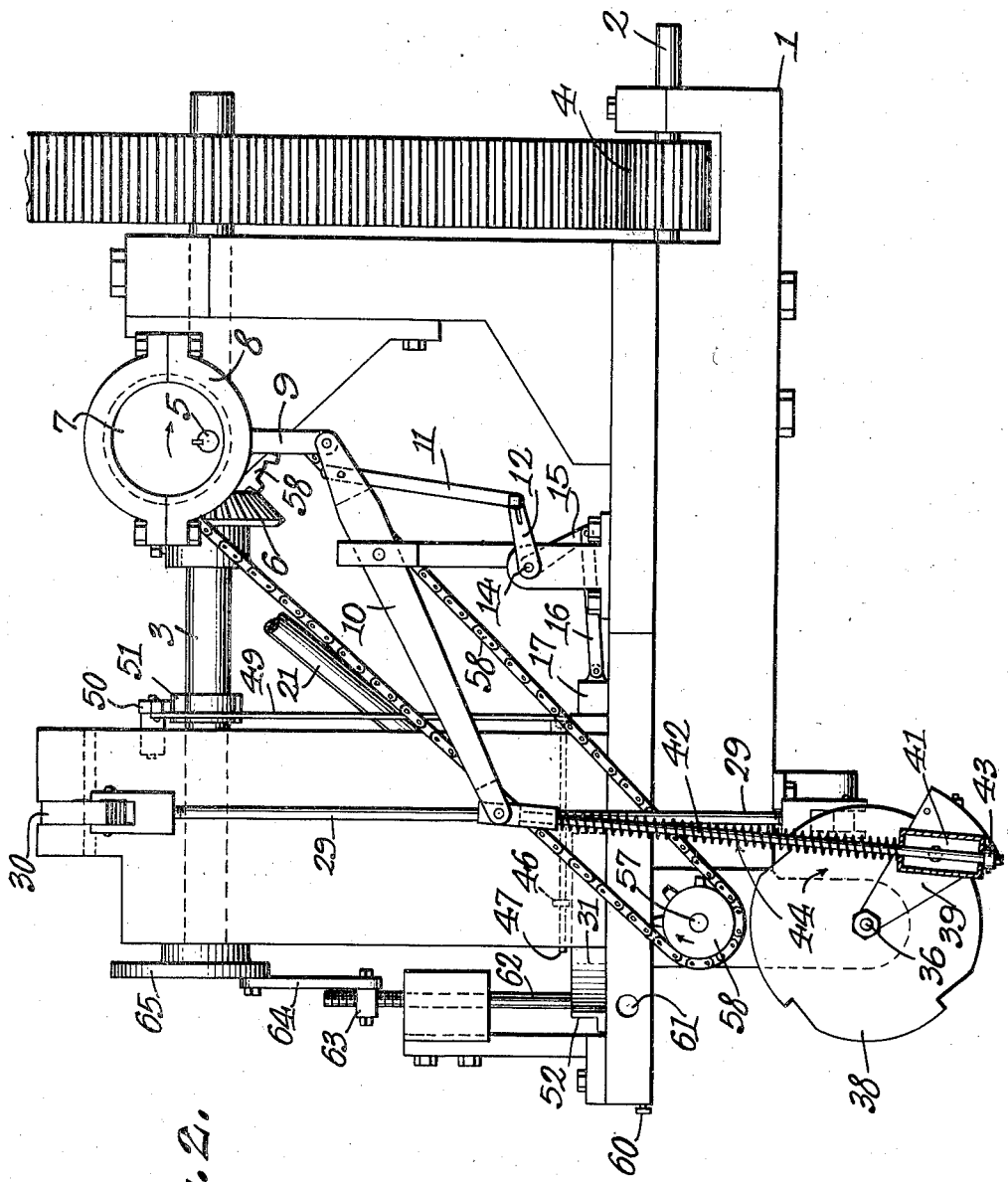

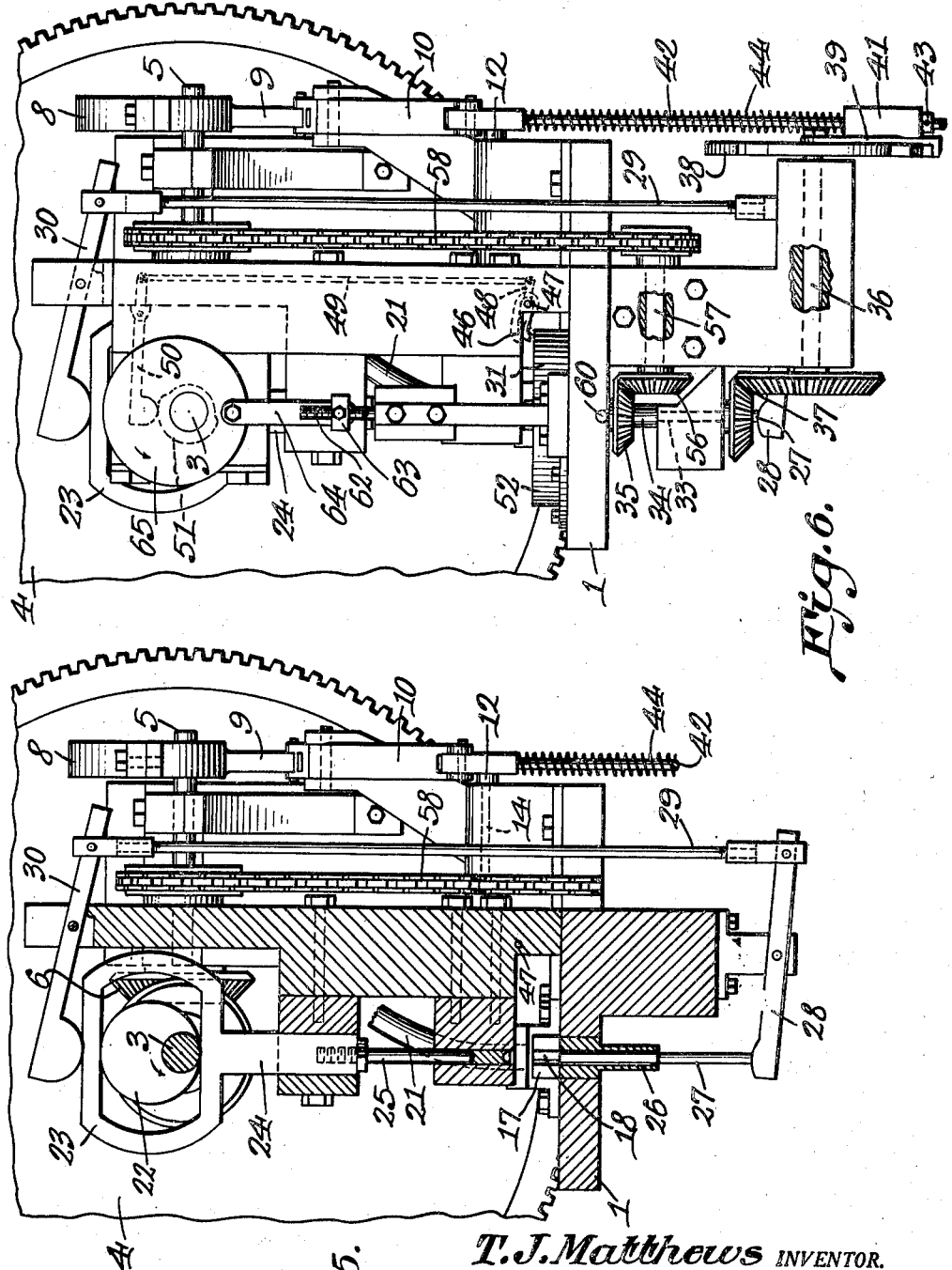

Oct. 7, 1941.   T. J. MATTHEWS   2,258,577
MACHINE FOR MAKING SMALL ARM AMMUNITION
Filed Aug. 29, 1939    5 Sheets-Sheet 5
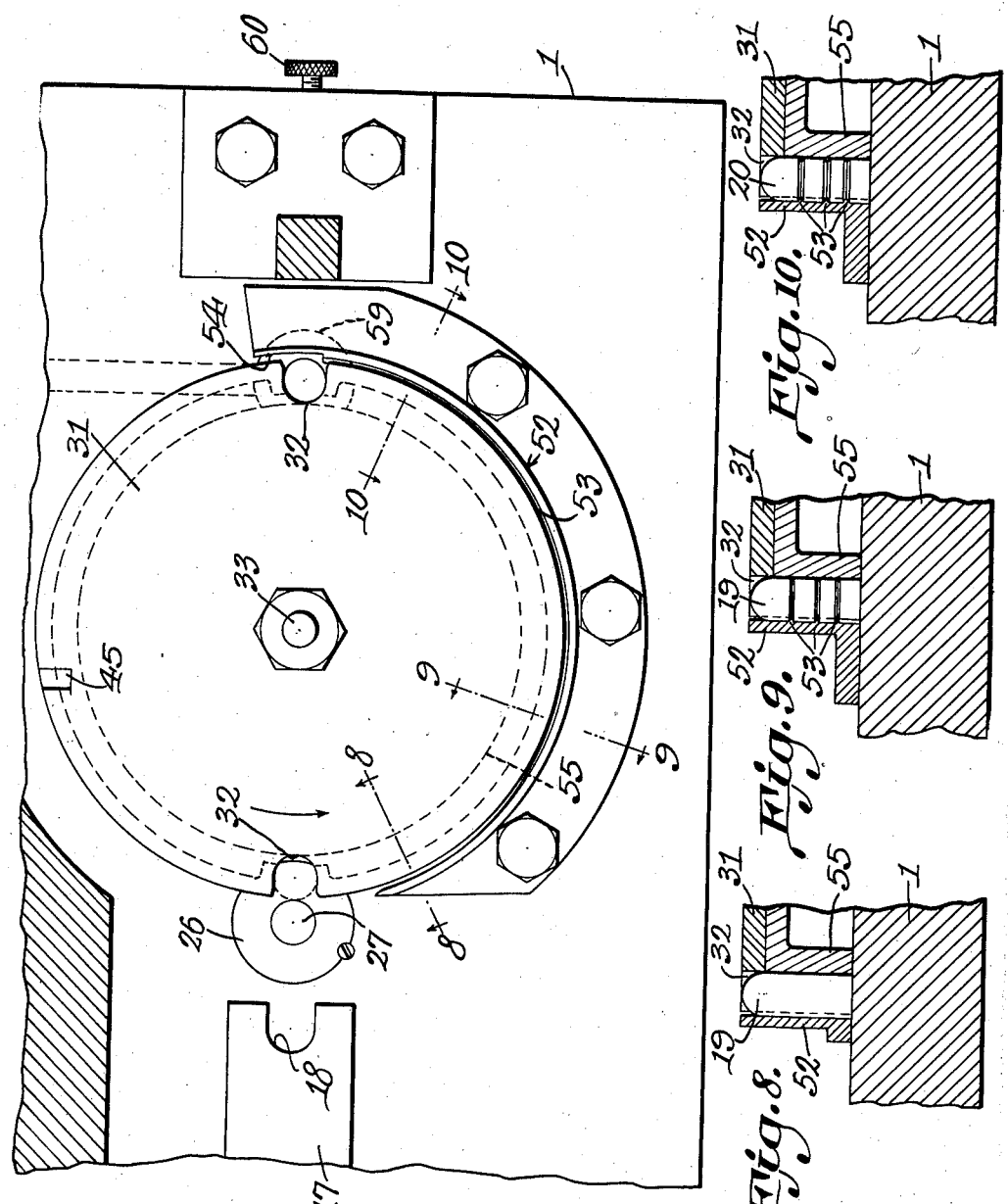
T. J. Matthews INVENTOR.
BY C. A. Snow & Co.
ATTORNEYS.

Patented Oct. 7, 1941

2,258,577

UNITED STATES PATENT OFFICE 2,258,577

MACHINE FOR MAKING SMALL ARM AMMUNITION

Thomas Jones Matthews, Oklahoma City, Okla.

Application August 29, 1939, Serial No. 292,540

7 Claims. (Cl. 29—1.22)

This invention aims to provide a simple but effective means for swaging a slug, moving the slug to a canneluring mechanism, and lubricating the finished bullet formed from the slug and proceeding from the canneluring mechanism, the aforesaid instrumentalities being of novel form, structurally, novel means being supplied for connecting them operatively, and for actuating them in properly timed relation.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in side elevation, a bullet forming machine constructed in accordance with the invention, parts being in section;

Fig. 2 is an elevation showing the opposite side of the machine from that delineated in Fig. 1;

Fig. 3 is a top plan;

Fig. 4 is a vertical section taken through the rotatable slug carrier and attendant parts;

Fig. 5 is a vertical section showing the mechanism whereby the slug is swaged;

Fig. 6 is an end elevation, wherein parts are broken away;

Fig. 7 is a top plan of the rotatable slug carrier and associated parts;

Figs. 8, 9 and 10 are sections taken, respectively, on the lines 8—8, 9—9 and 10—10 of Fig. 7.

The machine forming the subject matter of this application comprises a frame, denoted generally by the numeral 1. The frame need not be described with particularity, because it can be constructed in various ways, the utility of the machine remaining unimpaired.

It appears in Figs. 3 and 1, that a longitudinal drive shaft 2 is mounted to rotate in one end of the frame 1, a longitudinal driven shaft 3 being mounted to rotate in the frame, above the shaft 2, and in parallel relation thereto. The shafts 2 and 3 are operatively connected by spur gears 4 (Fig. 1).

Figure 3 shows that a transverse shaft 5 is mounted to rotate in the frame 1, at one side of the driven shaft 3. The shafts 3 and 5 are operatively connected by beveled gears 6.

An eccentric 7 (Fig. 2) is secured to one end of the shaft 5 and cooperates with a strap 8 having a depending stem 9. The stem 9 is pivoted to one end of a lever 10 of the first order, fulcrumed intermediate its ends on the frame 1.

To that end of the lever 10 which is adjacent to the stem 9 of the eccentric strap 8 is pivoted the upper end of a depending link 11, the lower end of the link being pivoted to an arm 12 on a transverse shaft 14 (Figs. 1, 5 and 6), supported for rocking movement on the frame 1.

The shaft 14 is provided with a depending arm 15, which, as Fig. 1 shows, is pivoted to one end of a substantially horizontal link 16, the inner end of the link being pivoted to a feed slide 17, held for right line sliding movement on the table portion of the frame 1. Figure 7 shows to good advantage that, in its inner end, the slide 17 is provided with a seat 18.

The slugs 19 of Fig. 1, which are to be formed into the bullets 20 of Fig. 10, move downwardly by gravity, or are impelled otherwise, through a guide tube 21 attached at its lower end to the framework of the machine, but spaced from the table of the machine, so that the feed slide 17 may operate below the lower end of the feed tube. The slugs 19, moving downwardly, are received in the seat 18 of the slide 17, and are moved to the right in Fig. 7, to be swaged by a mechanism to be described hereinafter.

The actuating train for the feed slide 17 includes the drive shaft 2, the spur gears 4, the driven shaft 3, the beveled gears 6, the shaft 5, the eccentric 7, the strap 8, the stem 9 of the strap, the lever 10, arm 12, link 11, shaft 14, the arm 15 and the link 16.

An eccentric 22, shown in Fig. 5, is secured to the intermediate portion of the driven shaft 3, and operates within a yoke 23, the depending shank 24 of which is guided for right line vertical movement in the frame 1. In the lower end of the shank 24 of the eccentric 22 is adjustably mounted a plunger 25, guided for right line movement in the frame 1, the plunger having in its lower end, a cavity which fashions the nose of the bullet 20 on the upper end of the slug 19.

The actuating train for the plunger 25 includes the drive shaft 2, the spur gears 4, the driven shaft 3, the eccentric 22, the yoke 23, and the shank 24 thereof.

A tubular swaging die 26 is mounted in the table of the machine, in axial alignment with the plunger 25, as Fig. 1 will make manifest. An expelling plunger 27 is mounted for straight line sliding movement in the swaging die 26, and is actuated by one end of a lever 28 of the first order, fulcrumed intermediate its ends on the frame 1, below the table thereof, as Fig. 5 shows. To that end of the lever 28 remote from the expelling plunger 27, an upwardly extended connecting rod 29 is pivoted, the upper end of the connecting rod being pivoted to a lever 30 of the first order, fulcrumed on the frame 1, the lever having a rounded head engageable with the upper part of the yoke 23 that is actuated by the eccentric 22 on the shaft 3.

The actuating train for the expelling plunger 27 embodies the drive shaft 2, the spur gears 4, the driven shaft 3, the eccentric 22, the yoke 23, the lever 30, the connecting rod 29 and the lever 28.

An inverted, cup-shaped slug carrier 31 (Fig. 1) is mounted for rotation about a vertical axis, above the table of the machine, and is shown in large scale in Fig. 7 of the drawings. In its periphery, the slug carrier 31 has oppositely disposed recesses 32. Reverting to Fig. 1, the slug carrier 31 is secured to a vertical shaft 33, which may be said to be supported for rotation in the table of the machine, although, as a matter of fact, the shaft is journaled in the tubular hub 34 of a beveled pinion 35, the utility and function of which will be brought out hereinafter. Figure 6 shows that a horizontal transverse shaft 36 is mounted to rotate in the lower part of the framework of the machine, below the table, the shafts 36 and 33 being connected by bevel pinions 37. To one end of the shaft 36 (Figs. 2 and 6) is secured a ratchet disk 38.

A radius arm 39 (Fig. 2) is mounted for swinging reciprocation on the shaft 36 and carries a spring actuated ratchet 40 (Fig. 1) adapted to cooperate with the ratchet disk 38. A connector 41 (Fig. 2) is pivotally mounted intermediate its ends on the radius arm 39. A pitman 42 can have longitudinal sliding movement in the connector 41, but, ordinarily, there is no longitudinal movement of the pitman with respect to the connector, because the connector is engaged between an adjustable set collar 43 on the lower end of the pitman, and a cushioning compression spring 44 about the pitman, the spring having a bearing at its lower end on the connector 41, and having a bearing at its upper end against a shoulder on the pitman 42. The upper end of the pitman 42 is pivoted to the lever 10.

Step by step rotation is imparted to the slug carrier 31, and the means to that end comprises the drive shaft 2, the spur gears 4, the driven shaft 3, the beveled gears 6, the shaft 5, the eccentric 7, the strap 8, the stem 9 of the strap, the lever 10, the pitman 42, the connector 41, the radius arm 39, the ratchet 40, the ratchet disk 38, the shaft 36, the beveled pinions 37, and the shaft 33.

In order to position one of the seats 32 of Fig. 7 properly to receive the slug, after it has been raised out of the swaging die 26 by the expelling plunger 27, and in order to position the other of the recesses 32 properly with respect to a lubricating die to be described hereinafter, a keeper notch 45 (Fig. 7) is formed in the upper surface of the slug carrier 31, at the periphery thereof. The keeper notch 45 is adapted to receive a latch finger 46, illustrated in Fig. 6, and secured to a horizontal shaft 47, mounted to rock in the framework of the machine. To the inner end of the shaft 47 is secured a crank arm 48, best illustrated by the dotted line showing of Fig. 6, but appearing also in Fig. 3. The lower end of a connecting rod 49 is pivoted to the arm 48, and has its upper end pivoted to one extremity of a lever 50 of the first order, fulcrumed on the frame 1 and supplied with a rounded head that bears upon a cam 51 secured to the driven shaft 3 (Figs. 6 and 1).

The actuating means for the latch finger 46 of Fig. 6 comprises the shaft 47, the arm 48, the connecting rod 49, the lever 50, the cam 51, the shaft 3, the spur gears 4 and the drive shaft 2.

Passing to the means whereby the cannelures are formed in the slug 19, to make the substantially completed bullet 20 of Fig. 10, an arcuate track 52 extends part-way around the rotatable slug carrier 31, as shown in Fig. 7, and is secured to the table of the machine. On its inner surface, the track 52 has vertically spaced ribs 53. The ribs 53 are deepest adjacent to the lubricating die to be described hereinafter, that is, adjacent to the right hand end of the track 52 in Fig. 7. The ribs 53 gradually decrease in depth, as they extend around the track 52, toward the swaging die 26. After the slug 19 has been received in the left hand recess 32 of the slug carrier 31 in Fig. 7, the slug is carried around and wiped over the ribs 53 on the track 52, and this operation promotes the formation of the cannelures in the bullet. A complete and satisfactory forming of the cannelures depends, however, upon a circumstance other than the mere carrying around of the slug, in an arc, over the ribs 53 of the track 52. The slug, in addition, should be rotated on a longitudinal axis, in order that its entire periphery may be subjected to the grooving formed by the ribs 53.

As to the means whereby the slug is rotated on its longitudinal axis, Figs. 4 and 8 to 10 disclose that a slug rotator 55 is mounted to turn on the table of the machine, within the slug carrier 31. The slug rotator 55 is secured to the tubular hub 34 of the beveled pinion 35, hereinbefore mentioned, the hub of the pinion being journaled in the table of the machine. The slug rotator 55 has contact with the slug whilst the slug is in the seat 32 of the rotatable slug carrier 31. The beveled pinion 35 (Fig. 6) meshes with a beveled pinion 56, secured to a transverse shaft 57, mounted to turn in the frame 1 of the machine. The shaft 57 is operatively connected with the shaft 5 by a chain and sprocket drive 58.

The driving train for the slug rotator 55 includes the drive shaft 2, the spur gears 4, the driven shaft 3, the beveled gears 6, the shaft 5, the chain and sprocket gearing 58, the shaft 57, the beveled gears 56 and 35 of Fig. 6, and the hub 34 (Fig. 1) of the beveled gear 35. Continuous rotation is imparted to the slug roller 55, but intermittent rotation is imparted to the slug carrier 31, since the pawl and ratchet mechanism 40—38 of Fig. 1 is interposed in the train by which the slug carrier 31 is rotated.

The slug, having been carried around by the slug carrier 31, and having been transformed into the finished bullet, shown substantially in that condition at 20 in Fig. 10, is thrust downwardly and lubricated. A downward thrusting of the bullet can be brought about readily, since, as shown at 54 in Fig. 7, the track 52 is recessed, adjacent to the lubricating mechanism.

The lubricating means embodies a lubricating die 59 (Fig. 1) held by any suitable means 69 in the table of the machine. Lubricating material is supplied to the die 59 by any suitable means adapted to that end, and intended to be mounted in an opening 61 (Fig. 2) in the table of the machine. In order to force the bullet down through the lubricating die 59, a plunger 62 is guided for right line vertical movement in the framework of the machine, the plunger being provided with a connection 63, adjustable longitudinally of the plunger, the connection being pivoted to a link 64, which is pivoted to a crank disk 65, secured to the end of the shaft 3.

The driving train for the plunger 62 of the lubricating die 59 is actuated by a train including the drive shaft 2, the spur gears 4, the driven shaft 3, the crank disk 65, the link 64 and the connection 63.

Since the operation of the machine has been described in connection with its various component mechanisms, a brief résumé will suffice at this place.

The slugs 19 (Fig. 1) move downwardly in the guide tube 21, and, as the feed slide 17 is advanced, a slug is received in the seat 18 of the feed slide (Fig. 7) and is moved to the right in Fig. 1, until the slug is aligned vertically with the swaging die 26. The slug moves downwardly into the swaging die 26, as shown in Fig. 4, and, as the plunger 25 moves downwardly, the slug is engaged between the plunger 25 and the plunger 27, and the rounded nose is formed on the slug, by the pressure of the plunger 25, which is recessed at its lower end to shape the nose on the slug. The plunger 25 rises. The plunger 27 rises, and the slug is carried upwardly, out of the swaging die 26.

By the time that the swaged and nosed slug has been lifted out of the die 26, the feed slide 17 has received a second slug, and, as the feed slide moves to the right in Fig. 4, the second slug moves the partially finished slug to the right, the partially completed slug being carried over into the left hand recess 32 of the slug carrier 31 in Fig. 7. The slug carrier 31 which, it will be recalled, is intermittently rotated, is held fixed, to receive the slug, due to the cooperation between the latch finger 46 of Fig. 6 and the keeper notch 45 of the slug carrier 31, shown in Fig. 7.

The latch finger 46 having been detached from the keeper notch 45 of the slug carrier 31, the slug carrier is free to rotate. The slug carrier 31 moves the slug around in an arc, over the ribs 53 of the track 52. During this movement of the slug, the slug is rotated on its longitudinal, vertical axis, by the cooperation between the slug and the continuously turned slug rotator 55 of Fig. 1. The ribs 53 on the track 52 form the cannelures in the slug and, ultimately, the slug, having been transformed into the bullet 20 of Fig. 10, is disposed above the lubricating die 59, of Fig. 1. Here there is a pause in the rotation of the slug carrier 31, the latch finger 46 of Fig. 6 being engaged temporarily in the keeper notch 45 (Fig. 7) of the slug carrier.

The plunger 62 moves downwardly, the bullet is forced through the lubricating guide 59, and the completed bullet passes out of the machine.

The machine is advantageous in use, in that the slugs are fed in rough, and come out as finished bullets. The slugs may be junk metal, and the reloader of ammunition can provide bullets at small cost. The machine is light, small and portable. Although capable of general use, it is adapted peculiarly for the use of gun clubs, police departments and the like, where there are many marksmen, but, ordinarily, no available device for turning out finished bullets rapidly and cheaply.

Having thus described the invention, what is claimed is:

1. In a bullet-forming machine, canneluring mechanism comprising a frame, an arcuate track mounted on the frame and provided on its inner surface with a canneluring rib, and a carrier journaled on the frame and rotatable in close relation to the rib, the carrier comprising means for holding a slug for rotation about a defined axis, whilst the carrier rotates to move the slug longitudinally of the rib.

2. In a bullet-forming machine, a frame, canneluring mechanism comprising an arcuate track mounted on the frame and provided on its inner surface with a canneluring rib, a carrier journaled on the frame and rotatable in close relation to the rib, the carrier comprising a seat which holds a slug whilst the carrier rotates to move the slug longitudinally of the rib, and means for rotating a slug in the seat, about an axis substantially parallel to the axis of rotation of the carrier.

3. In a bullet-forming machine, canneluring mechanism comprising a frame, an arcuate track mounted on the frame and provided on its inner surface with a canneluring rib, a hollow carrier supported for rotation on the frame and having a slug-receiving seat movable in close relation to the rib, a slug-rotator supported for rotation on the frame and located within the carrier, the rotator being provided with a smooth periphery having slug-contact within the seat, means for rotating the carrier to move a slug longitudinally of the rib, and means for rotating the slug rotator.

4. In a bullet-forming machine, canneluring mechanism comprising a frame, an arcuate track mounted on the frame and provided on its inner surface with a canneluring rib, a hollow carrier supported for rotation on the frame and having a slug-receiving seat movable in close relation to the rib, a slug-rotator supported for rotation on the frame and located within the carrier, the rotator being provided with a smooth periphery having slug-contact within the seat, mechanism for rotating the carrier intermittently, to move a slug longitudinally of the rib, and to stop the rotation of the carrier when a slug is clear of the rib, and means for imparting continuous rotation to the slug-rotator.

5. A bullet-forming machine, constructed as set forth in claim 4, in combination with a latch movably mounted on the frame, and means for connecting the latch operatively with said mechanism, to cause the latch to engage the carrier and hold it against rotation when a slug is clear of the rib.

6. In a bullet-forming machine, canneluring mechanism comprising a frame, an arcuate track mounted on the frame and provided on its inner surface with a canneluring rib, a hollow rotatable carrier having a slug-receiving seat movable in close relation to the rib, a slug-rotator mounted to turn within the carrier and provided with a smooth periphery having slug-contact within the seat, a tubular shaft journaled in the frame and connected to the rotator, an inner shaft journaled in the tubular shaft and conected to the carrier, third and fourth shafts journaled on the frame and disposed at right angles to the tubular and inner shafts, beveled gears connecting the tubular and inner shafts, respectively, with the third and fourth shafts, a fifth shaft journaled on the frame, means for rotating the third shaft continuously from the fifth shaft, and means for imparting intermittent rotation to the fourth shaft from the fifth shaft.

7. In a bullet-forming machine, a bullet-lubricating device, a canneluring mechanism constituting means for passing a bullet to the lubricating device, a bullet swage including an ejecting device, and means for moving a slug into the field of operation of the swage, the ejecting device constituting means for moving a swaged bullet between the canneluring mechanism and a slug which is on its way to the swage, whereby the slug will advance the swaged bullet into the field of operation of the canneluring mechanism.

THOMAS JONES MATTHEWS.